United States Patent [19]
Trompower

[11] Patent Number: 6,005,883
[45] Date of Patent: Dec. 21, 1999

[54] DIRECT SEQUENCE NETWORK AND METHOD USING PN SEQUENCE SELECTION TO REPRESENT DATA

[75] Inventor: Michael L. Trompower, Navarre, Ohio

[73] Assignee: Aironet Wireless Communications, Inc., Fairlawn, Ohio

[21] Appl. No.: 08/592,130

[22] Filed: Jan. 26, 1996

[51] Int. Cl.[6] .............................. H04B 15/00; H04K 1/00; H04L 27/30
[52] U.S. Cl. ........................ 375/200; 370/431; 375/208; 455/49.1; 455/500
[58] Field of Search .................... 370/209, 242, 370/479; 375/200, 206, 208; 455/7, 13.1, 23, 32.2, 33.3, 524

[56] References Cited

U.S. PATENT DOCUMENTS

| | | |
|---|---|---|
| 5,157,686 | 10/1992 | Omura et al. . |
| 5,166,952 | 11/1992 | Omura et al. . |
| 5,295,154 | 3/1994 | Meier et al. ............................. 375/200 |
| 5,515,396 | 5/1996 | Dalekotzin ............................. 375/206 |
| 5,553,076 | 9/1996 | Behtash et al. ........................ 370/95.3 |
| 5,614,914 | 3/1997 | Bolgiano et al. ...................... 342/364 |
| 5,724,383 | 3/1998 | Gold et al. ............................. 375/208 |

*Primary Examiner*—Stephen Chin
*Assistant Examiner*—Joseph Roundtree
*Attorney, Agent, or Firm*—Arter & Hadden LLP

[57] ABSTRACT

A direct sequence spread spectrum (DSSS) system which uses PN sequences to encode data so as to increase data throughput. In particular, a system for communicating a plurality of data values using multiple spreading sequences is provided. The system transmits data by selecting at least one of the multiple spreading sequences based on at least one data value included in the plurality of data values; and transmitting other data values included in the plurality of data values using the at least one of the multiple spreading sequences to spread the other data values.

40 Claims, 12 Drawing Sheets

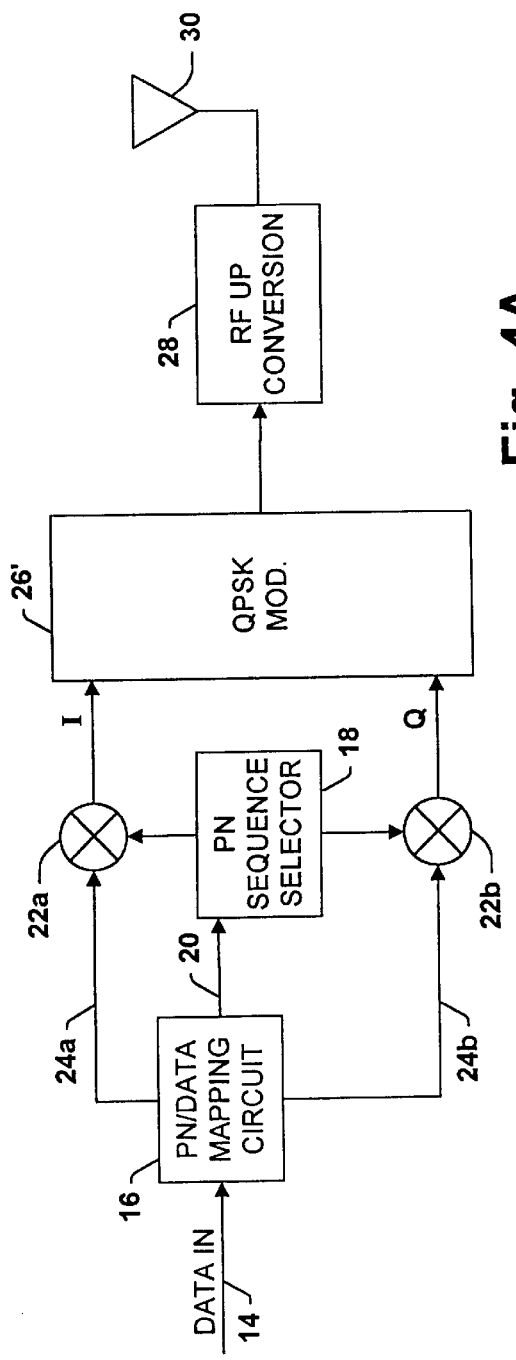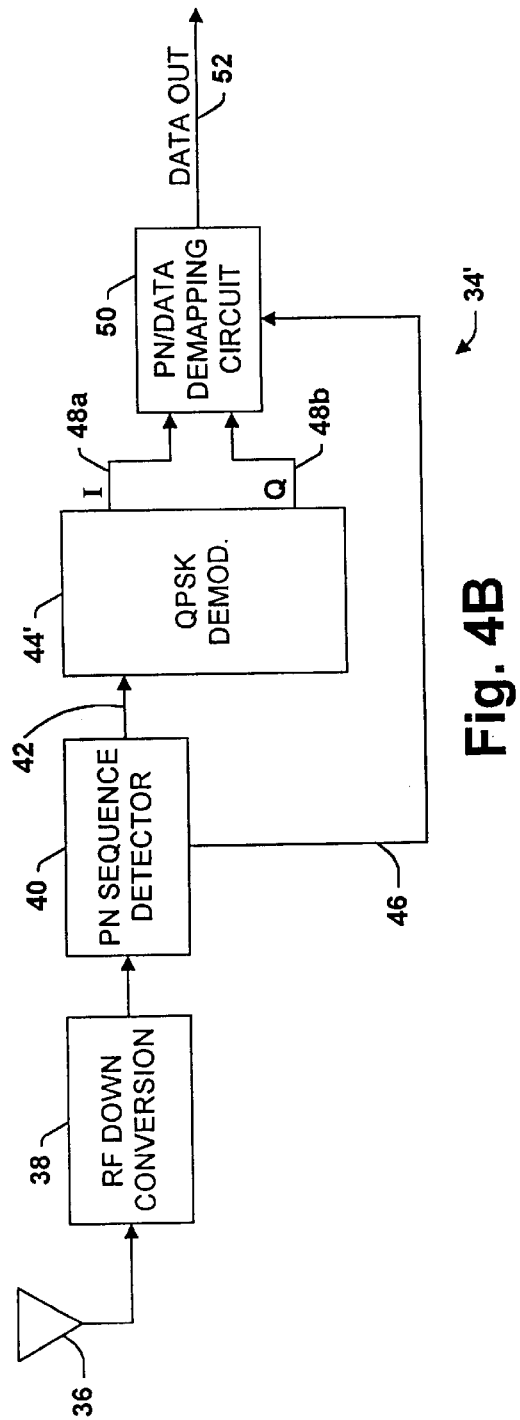

DIRECT SEQUENCE NETWORK AND METHOD USING PN SEQUENCE SELECTION TO REPRESENT DATA

TECHNICAL FIELD

The present invention relates generally to the field of data communication systems and, in particular, to a direct sequence spread spectrum communication system which utilizes multiple PN sequences representing data to provide high data throughput.

BACKGROUND OF THE INVENTION

In recent years, the use of cellular communication systems having mobile terminals which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects.

A typical cellular communication system includes a number of fixed base stations interconnected by a cable medium to form a hardwired network. The hardwired network is often referred to as a system backbone. Also included in many cellular communication systems are intermediate base stations which are not directly connected to the hardwired network. Intermediate base stations, often referred to as wireless base stations, increase the area within which base stations connected to the hardwired network can communicate with mobile terminals. Unless otherwise indicated, the term "base station" will hereinafter refer to both base stations hardwired to the network and wireless base stations.

Wireless communication systems such as the cellular communication system described above often involve spread spectrum (SS) technology. An SS communication system is one in which the transmitted frequency spectrum or bandwidth is much wider than absolutely necessary. Generally, SS technology is used by those who wish to communicate in the unlicensed bands provided by the FCC. These bands include the 902 through 928 MHZ and 2.4 through 2.48 GHz ranges. The FCC requires that information transmitted in the bands be spread and coded in order to allow multiple users to communicate in these bands at the same time.

One type of a SS communication system is known as a direct sequence spread spectrum (DSSS) system. The coding scheme for a DSSS communication system utilizes a pseudo-random binary sequence (PRSB). In a DSSS system, coding is achieved by converting each original data bit (zero or one) to a predetermined repetitive pseudo noise (PN) sequence or code. A type of PN sequence is illustrated in FIG. 1. For this example, the digital data signal 110 is made up of a binary "1" bit and a "0" bit. A PN sequence 120 representing the digital data signal 110 is comprised of a sequence of ten sub bits or chips, namely, "1", "0", "1", "1", "0", "1", "1", "1", "0", "1".

The digital data signal 110 is coded or spread by modulo 2 multiplying (e.g., via an "EXCLUSIVE NOR" (XNOR) function) of the digital data signal 110 with the PN sequence 120. If the data bit is a "1", then the resulting spread data signal (PN coded signal) in digital form corresponds to the PN sequence 120. However, if the data bit to be coded is a "0", then the spread data signal in digital form will correspond to a code 130. As can be seen, the code 130 is the inverse of PN sequence 120. That is, the PN sequence and its inverse are used to represent data bits "1" and "0" respectively.

FIG. 2 schematically illustrates a transmitter portion or assembly 100 of a DSSS system. Original data bits 101 are input to the transmitter portion 100. The transmitter portion includes a modulator 102, a spreading function 104 and a transmit filter 106. The modulator 102 modulates the data onto a carrier using, for example, a binary phase shift keying (BPSK) modulation technique. The BPSK modulation technique involves transmitting the carrier in-phase with the oscillations of an oscillator or 180 degrees out-of-phase with the oscillator depending on whether the transmitted bit is a "0" or a "1". The spreading function 104 converts the modulated original data bits 101 into a PN coded chip sequence, also referred to as spread data. The PN coded chip sequence is transmitted via an antenna so as to represent a transmitted PN coded sequence as shown at 108.

FIG. 2 also illustrates a receiver portion or assembly, shown generally at 150. The receiver portion 150 includes a receive filter 152, a despreading function 154, a bandpass filter 156 and a demodulator 158. The PN coded data 108 is received via an antenna and is filtered by the filter 152. Thereafter, the PN coded data is decoded by a PN sequence despreading function 154. The decoded data is then filtered and demodulated by the filter 156 and the demodulator 158 respectively to reconstitute the original data bits 101. To receive the transmitted spread data, the receiver portion 150 must be tuned to the same predetermined carrier frequency and be set to demodulate a BPSK signal using the same predetermined PN sequence.

In order to receive an SS transmission signal, the receiver portion must be tuned to the same frequency as the transmitter assembly to receive the data. Furthermore, the receiver portion must use a demodulation technique which corresponds to the particular modulation technique used by the transmitter assembly (i.e. same PN sequence length, same chipping rate, BPSK). Because mobile terminals communicate with a common base station, each device in the cellular network must use the same carrier frequency and modulation technique.

A PN sequence length refers to a length of the coded sequence (the number of chips) for each original data bit. As noted above, the PN sequence length effects the processing gain. A longer PN sequence yields a higher processing gain which results in an increased communication range. The PN sequence chipping rate refers to the rate at which the chips are transmitted by a transmitter portion. A receiver portion must receive, demodulate and despread the PN sequenced chip sequence at the chipping rate utilized by the transmitter portion. At a higher chipping rate, the receiver portion is allotted a smaller amount of time to receive, demodulate and despread the chip sequence. As the chipping rate increases so to will the error rate. Thus, a higher chipping rate effectively reduces communication range. Conversely, decreasing the chipping rate increases communication range.

The spreading of a digital data signal by the PN sequence does not effect overall signal strength (or power) the data being transmitted or received. However, by spreading a signal, the amplitude at any one point typically will be less then the original (non-spread) signal.

Data throughput rate has become an ever increasingly important factor in the communication market. Market forces have been dictating the need for the ability to communicate in real-time and to be able to exchange data with high speed, low error and efficiency. In order to increase data throughput rate, conventional DS systems and/or hybrid systems using conventional DS technology typically have accepted a loss in transmission range or used larger amounts of bandwidth to transmit the data. However, transmission range and spectral bandwidth efficiency are also important elements to DS systems. Therefore, there is a strong need in the art for a method and system for improving data throughput rate without necessarily sacrificing data transmission range, spectral efficiency or other critical elements of a DS system.

SUMMARY OF THE INVENTION

The present invention relates to a direct sequence spread spectrum (DSSS) system which uses multiple PN sequences as a manner of encoding data. According to a preferred embodiment, the PN sequences are used to encode a portion of the data to be transmitted in order to increase data throughput. This can be distinguished from the conventional technique where all the data is transmitted using the same PN sequence.

The present invention uses multiple PN sequences during the transfer of a "packet" or sequence of data. The use of multiple PN sequences adds an extra dimension in which data can be conveyed from a transmitter to a receiver. This translates into higher data rates, quicker packet delivery, and smaller probability of packet collisions as will be appreciated based on the detailed description provided below. At the same time, only minimal changes are needed in conventional systems in order to carry out the invention.

In accordance with one particular aspect of the invention, a method for communicating a plurality of data values using multiple spreading sequences is provided, including the steps of selecting at least one of the multiple spreading sequences based on at least one data value included in the plurality of data values; and transmitting other data values included in the plurality of data values using the at least one of the multiple spreading sequences to spread the other data values.

In accordance with another aspect of the invention, a device for communicating a plurality of data values using multiple spreading sequences is provided, comprising a selection circuit for selecting at least one of the multiple spreading sequences based on at least one data value included in the plurality of data values; and a transmitting circuit for transmitting other data values included in the plurality of data values using the at least one of the multiple spreading sequences to spread the other data values.

According to still another aspect of the invention, a cellular communication system is provided, including a network; a host computer coupled to the network; a plurality of base stations coupled to the network and communicating with the host computer, each of the base stations comprising a base station transmitter system for transmitting wireless communications and a base station receiver system for receiving wireless communications; and a plurality of mobile terminals each for communicating with the network by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to at least one of the mobile terminals, at least one of the mobile terminal transmitter systems wirelessly communicates a set of data having a first subset and a second subset by selectively encoding each data bit of second subset with one of one or more spreading sequences selected by the first subset and wirelessly transmitting the encoded second subset.

In accordance with another aspect of the invention, a cellular communication system is provided, including a network; a host computer coupled to the network; a plurality of base stations coupled to the network and communicating with the host computer, each of the base stations comprising a base station transmitter system for transmitting wireless communications and a base station receiver system for receiving wireless communications; and a plurality of mobile terminals each for communicating with the network by way of at least one of the plurality of base station, each of the plurality of mobile terminals having a mobile terminal transmitter for transmitting wireless communications to the at least one of the plurality of base stations and a mobile terminal receiver system for receiving wireless communications from the at least one of the plurality base stations; wherein, with respect to at least one of the base stations, at least one of the base station transmitter systems wirelessly communicates a set of data having a first subset and a second subset by selectively encoding each data bit of the second subset with one of one or more spreading sequences selected by the first subset and wirelessly transmitting the encoded second subset.

According to another aspect of the invention, a method of encoding a set of data bits for transmission in a cellular communication system, the set of data bits comprising a first subset of data bits and a second subset of data bits, the method comprising the steps of: preselecting two or more spreading sequences; preassigning a unique value to each of one or more different arrangements of the preselected two or more spreading sequences, each of the unique values representing one or more data bits; representing the first subset of data bits with one of the one or more different arrangements of the preselected two or more spreading sequences in accordance with a predefined relationship between the first subset of data bits and the preassigned unique values; and encoding the second subset of data bits based on the one arrangement of the preselected two or more spreading sequences representing the first subset of data bits.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 4A and 4B are block diagrams of a transmitter portion and receiver portion, respectively, of a DSSS QPSK system in accordance with a second embodiment of the present invention;

DETAILED DESCRIPTION OF THE PREFERRED EMBODIMENTS

Figure 1:
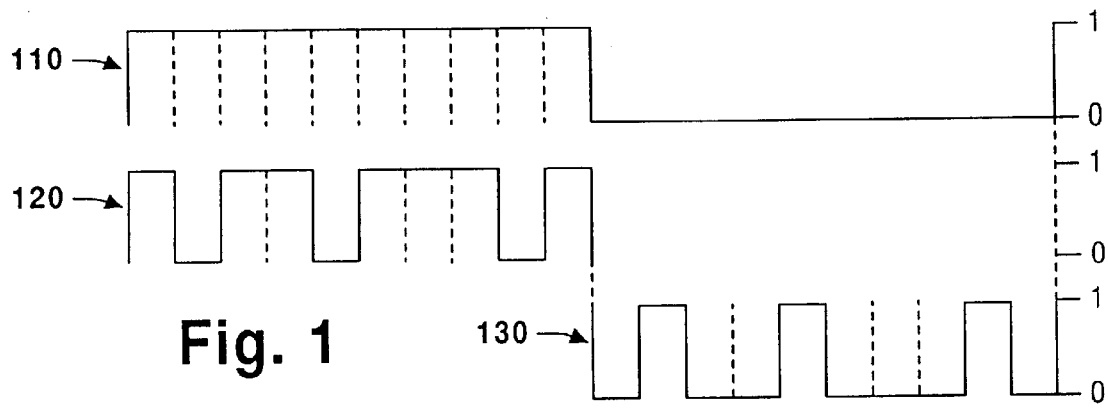
FIG. 1 is a schematic representation of a PN coded signal for data bits "0" and "1"
Figure 2:
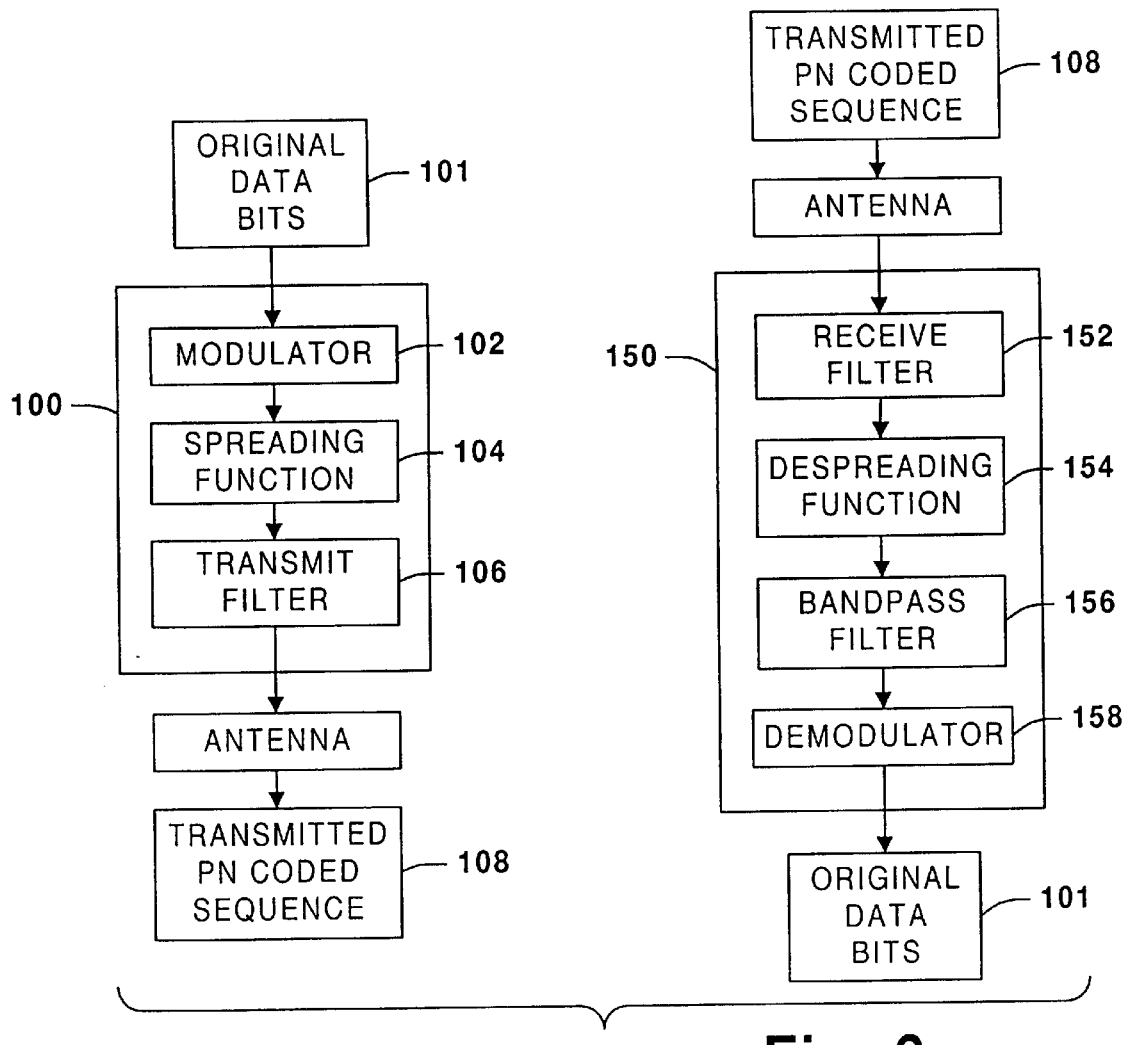
FIG. 2 is a general representation of a transmitter portion and a receiver portion of a DSSS communication system.

The present invention will now be described with reference to the drawings in which like reference numerals are used to refer to like elements throughout. In order to facilitate understanding of the invention, the invention will be described by way of multiple examples. It will be appreciated, however, that such examples are not meant to be limiting. The aspect of utilizing multiple PN sequences to encode data and increase data throughput can be extended to various other embodiments and examples without departing from the scope of the invention.

Figure 3A:
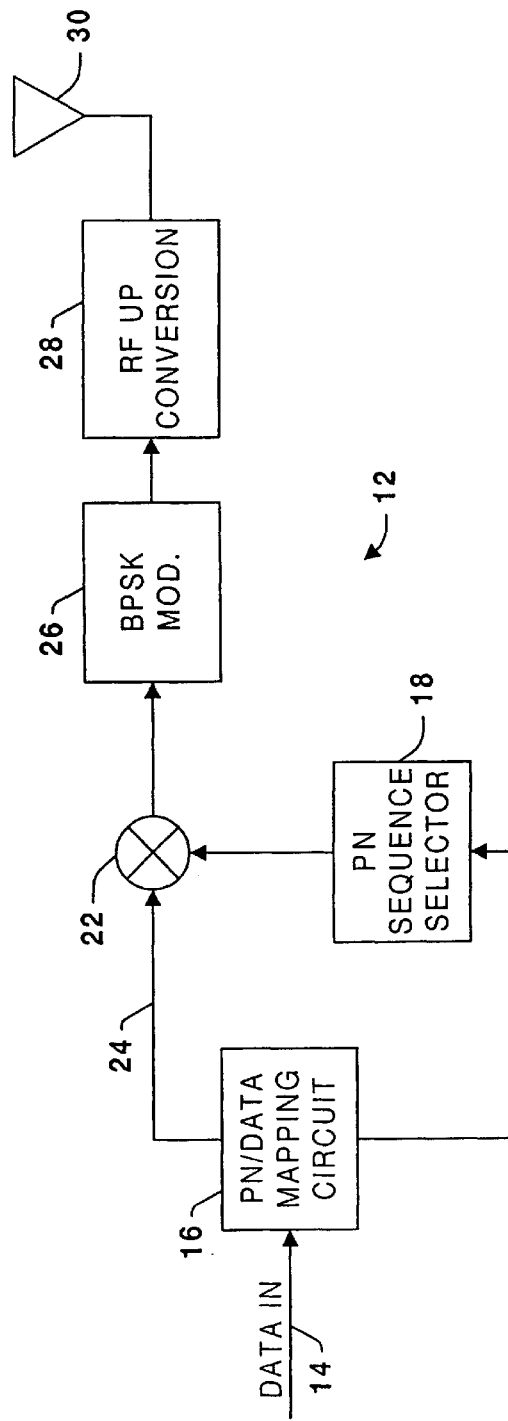
FIGS. 3A and 3B are block diagrams of a transmitter portion and receiver portion, respectively, of a DSSS BPSK system in accordance with a first embodiment of the present invention.
Figure 3B:
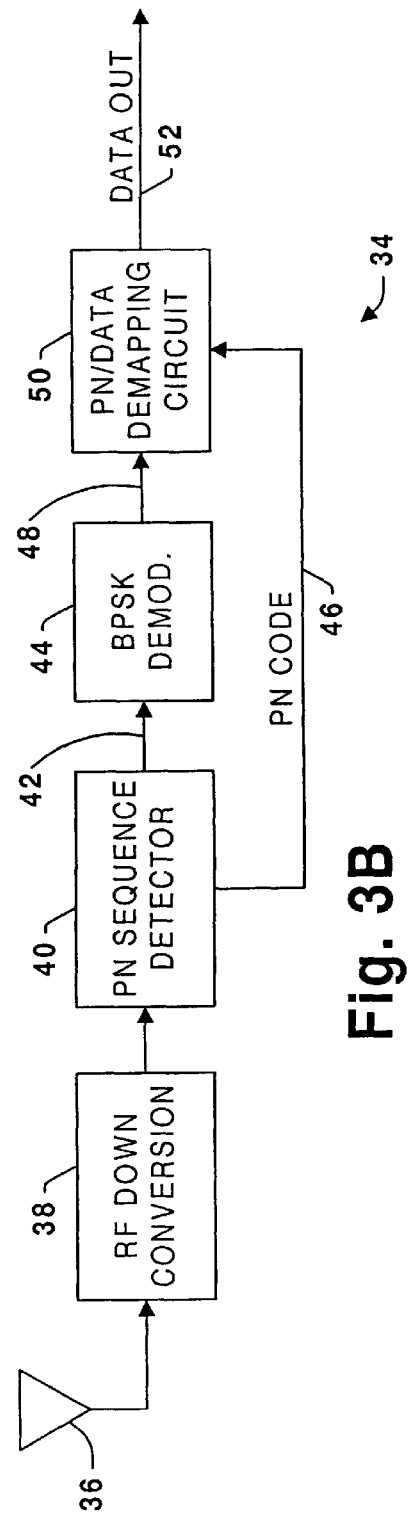

Referring initially to FIGS. 3A and 3B, a first embodiment of the present invention is shown. FIG. 3A represents a transmitter portion 12 of a communication device such as a cellular radio or the like. Such a cellular radio may form part of a mobile terminal or base station in the cellular communication system described above.

As described more fully below, the transmitter portion 12 receives digital data to be transmitted via line 14. In the exemplary embodiment, the data on line 14 is provided serially at a given data rate, although such data could be provided in parallel in another embodiment. The data consists of a sequence of bits (i.e., digital "1"s and "0"s) which form a packet of data as is conventional in digital communications. The data on line 14 is input to a PN/DATA mapping circuit 16 which evaluates every predetermined number of bits in the sequence. With respect to each predetermined number of bits in the sequence, the mapping circuit 16 provides a PN sequence selection signal to a PN sequence selector 18 via line 20 based on the values of one or more bits. As for the remaining bits in the predetermined number, the mapping circuit 16 provides these bits to a spreading multiplier 22 via line 24. These remaining bits are thereafter spread by the spreading multiplier 22 according to conventional techniques in accordance with the particular PN sequence(s) provided by the PN sequence selector 18 to the spreading multiplier 22.

The spread data produced by the spreading multiplier 22 is provided to a BPSK modulator 26 which modulates the data using conventional techniques. The modulated data from the BPSK modulator 26 is provided to a conventional radio frequency (RF) up conversion circuit 28 which mixes the modulated data onto an RF carrier and provides the appropriate filtering. The conversion circuit 28 then transmits the modulated RF signal via a transmitting antenna 30.

The PN sequence selector 18 has stored or otherwise generates therein two or more different PN sequences used for spreading the digital data provided to the spreading multiplier 22. Each different PN sequence is associated with a unique PN sequence selection signal provided by the mapping circuit 16, each PN sequence selection signal value being a function of a portion of the data. When the PN sequence selector 18 receives the PN sequence selection signal(s) from the mapping circuit 16, the PN sequence selector 18 determines which PN sequence(s) are associated with such selection signal and outputs a "selected" PN sequence(s) to the spreading multiplier 22.

As will be better appreciated in view of the more detailed description provided below, the present invention encodes a portion of the data received on line 14 by way of selecting one or more different PN sequences from among a plurality of PN sequences. These selected PN sequences are then utilized to spread the remaining portion of the data received by the PN mapping circuit 16 so that the data can ultimately be transmitted to a destination. Because a portion of the data received by the PN mapping circuit 16 is encoded by way of the particular PN sequences utilized and less data is actually spread and transmitted, the overall data throughput of the system is increased. For example, the data throughput can be doubled while maintaining a constant data input rate on line 14 as discussed in Example 1 below.

Referring now to FIG. 3B, a receiver portion 34 of a communication device is shown. In this embodiment, the receiver portion 34 is designed to receive data communications originating from the transmitting portion 12 shown in FIG. 3A. As will be appreciated, in a given system there may be multiple communication devices each including a transmitting portion 34 and/or receiving portion 12 depending on the function of the communication device. If a device is intended to transmit and receive data with respect to other devices, it will of course include both the transmitting portion 12 and the receiving portion 34. Likewise, devices intended to transmit or receive information exclusively need include only the respective transmitter or receiver portion.

The receiving portion 34 includes a receiving antenna 36 for receiving a modulated RF signal produced in accordance with the transmitter portion 12 of FIG. 3A. The receiving antenna 36 may be the same antenna used for transmitting as will be appreciated. The signal received by the antenna 36 is input to a conventional RF down conversion circuit 38 which removes the RF carrier and outputs the modulated data signal to a PN sequence detector 40. As is described more fully below, the PN sequence detector 40 is designed to detect which one or more of the different PN sequences utilized by the PN sequence selector 18 (FIG. 3A) is used to spread the data which is received from the RF down conversion circuit 38. In the preferred embodiment, the PN sequence detector 40 includes a bank of correlators. Each correlator is designed to detect a given one of the possible PN sequences. The correlator, designed to detect the PN sequence which was actually used to spread the received data, will exhibit the best correlation among the correlators.

The correlator, exhibiting the best correlation, is selected and its output is utilized to despread the received data. The despread data is output on line 42 to a BPSK demodulator 44. In addition, the PN sequence detector 40 outputs a PN code signal(s) on line 46 which is indicative of the particular PN sequence(s) utilized to despread the received data. The PN code signal is input along with the demodulated data on line 48 to a PN/DATA demapping circuit 50. The demapping circuit 50 in effect reconstructs the original data sequence transmitted by the transmitter portion 12 by combining the demodulated data provided by the BPSK demodulator 46 and the data values associated with the particular PN sequence(s) identified by the PN code signal. As previously mentioned, each PN sequence is associated with a unique value of a portion of the input data. Thus, the entire input data sequence as originally transmitted can be reconstructed by the demapping circuit 50 and serially output on line 52.

Turning now to FIGS. 4A and 4B, a second embodiment of the present invention is shown. In this embodiment, the invention is implemented via a DSSS QPSK system. The transmitter portion is denoted 12' as shown in FIG. 4A, and the receiver portion is denoted 34' as shown in FIG. 4B. The functions of many of the components in this embodiment are identical to that described in connection with the BPSK embodiment of FIGS. 3A and 3B. As a result, only the differences will be discussed in detail at this time.

Referring to the transmitter portion 12' shown in FIG. 4A, again data is input via line 14. The mapping circuit 16 in this embodiment similarly outputs a PN sequence selection signal on line 20 based on the values of one or more bits in a given predetermined number of bits which the mapping circuit 16 receives on line 14. As for the remaining bits in the mapping circuit 16, a portion of the data is provided on line 24a to spreading multiplier 22a, and another portion is provided on line 24b to spreading multiplier 22b. The PN sequence selector 18 receives the PN sequence selection signal(s) from the mapping circuit 16 and outputs the one or more PN sequences associated with the particular selection signal(s) concurrently to each of the spreading multipliers 22a and 22b. As a result, the data provided on lines 24a and 24b is spread in accordance with the selected PN sequence (s) to produce I and Q components, respectively, for use in the QPSK modulation. The I and Q components are input to a QPSK modulator 26' which modulates the components using conventional techniques. The QPSK modulator 26' then provides the modulated signal to the RF up conversion circuit 28 which transmits the signal via the antenna 30 as in the previous embodiment.

With respect to the receiving portion 34', again the antenna 36 and RF down conversion circuit 38 receive the modulated RF carrier and output the spread data signal to the PN sequence detector 40. As before, the PN sequence detector 40 detects the particular PN sequence used to spread the data being transmitted in the modulated data signal. The PN sequence detector 40 provides a PN code signal to the PN/DATA demapping circuit 50 via line 46 identifying the particular PN sequence. In addition, the PN sequence detector 40 despreads the modulated data signal and outputs the signal to a QPSK demodulator 44' via line 42. Employing conventional techniques, the QPSK demodulator 44' demodulates the signal into the I and Q components which are provided on lines 48a and 48b, respectively. The PN/DATA demapping circuit 50 then reconstructs the original data transmitted by the transmitter portion 12' based on the data represented by the I and Q components and the particular PN sequence used to spread such data. The PN/DATA demapping circuit 50 then serially outputs the data via line 52. The manner in which the data is mapped and demapped, based on a plurality of PN sequences in accordance with the present invention, will be understood more fully based on the following particular examples.

EXAMPLE 1

Figure 5A:
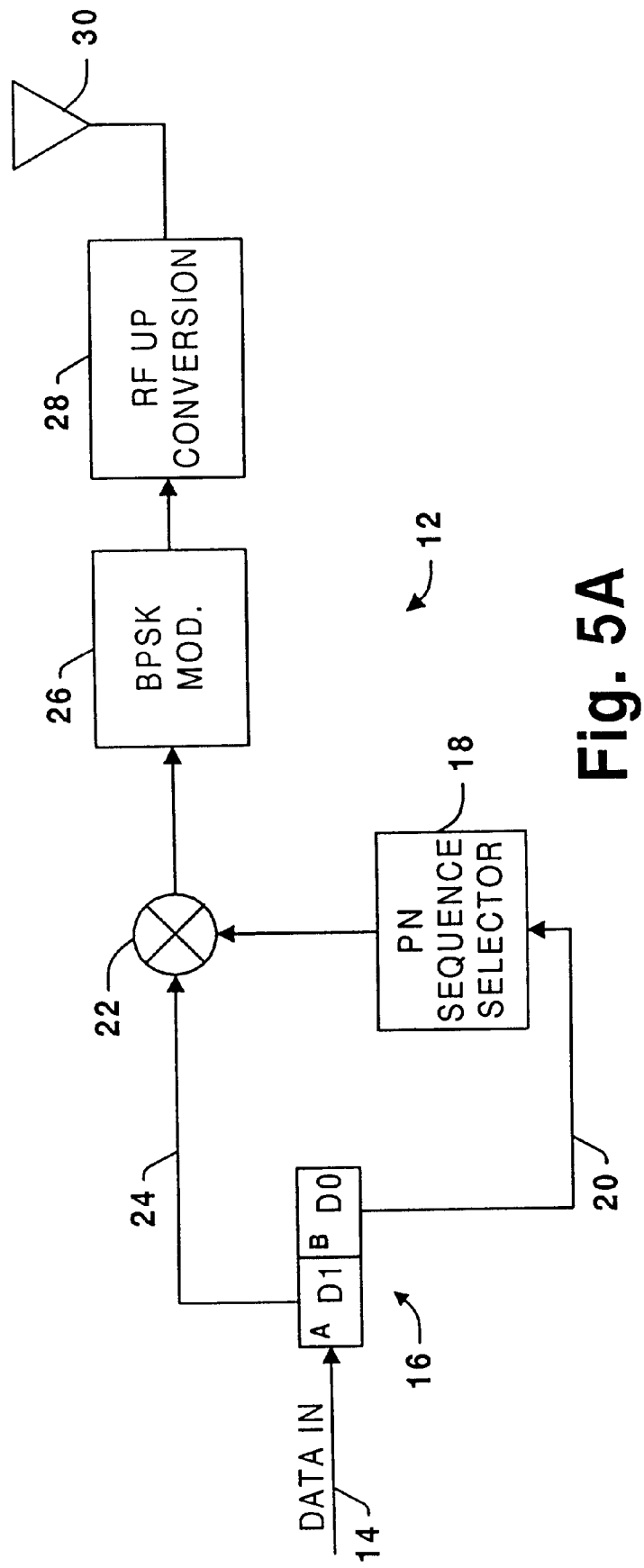
FIGS. 5A and 5B are block diagrams of a transmitter portion and receiver portion, respectively, of a DSSS BPSK system in accordance with a first example of the present invention wherein two different PN sequences are utilized to encode the data.
Figure 5B:
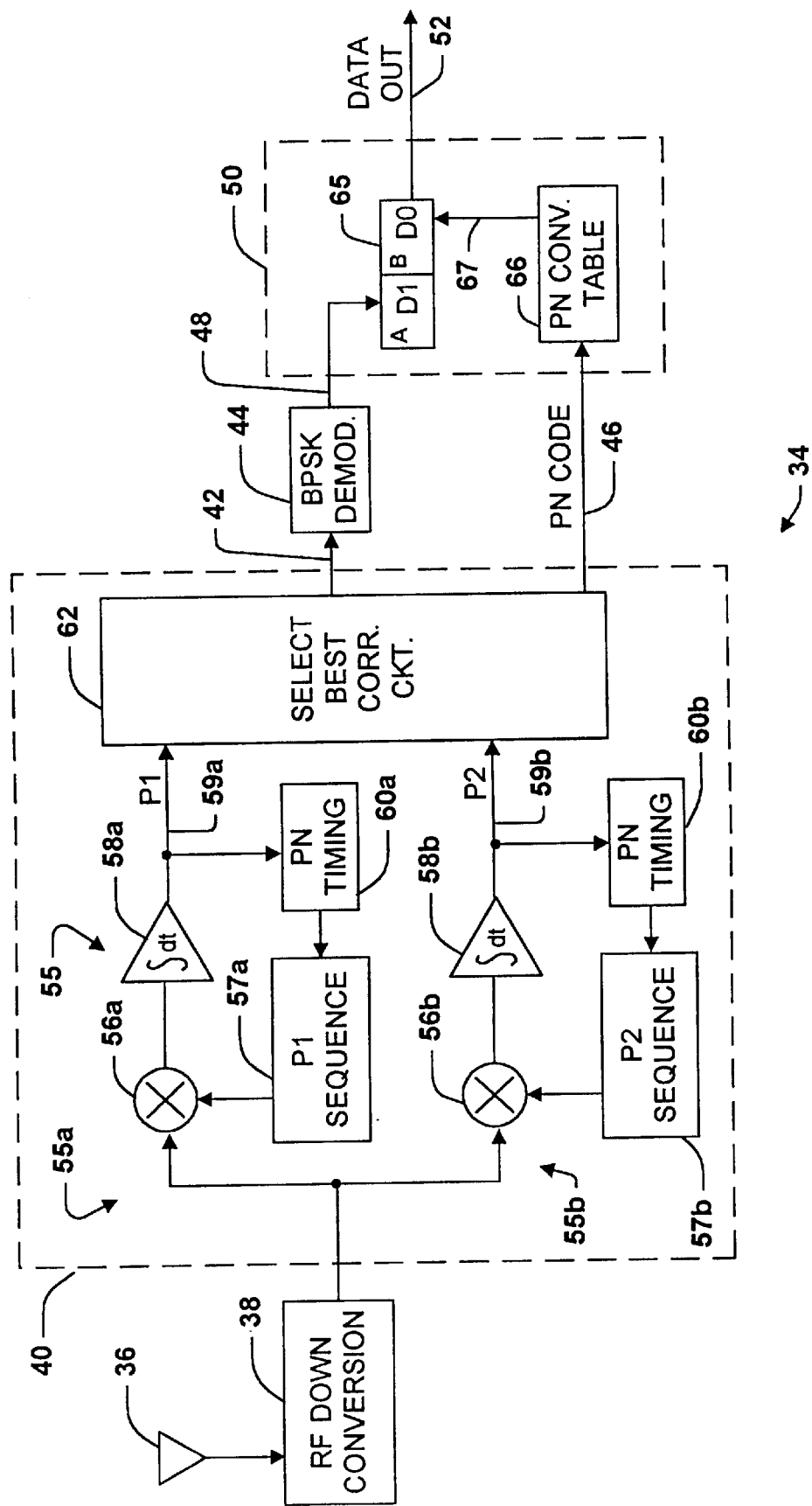

FIGS. 5A and 5B are detailed block diagrams of a transmitter portion and receiver portion, respectively, of a DSSS BPSK system as represented in FIGS. 3A and 3B in accordance with a first example of the present invention. In this example, two different PN sequences are utilized to encode the data received on line 14 and are arbitrarily denoted P1 and P2. The data received on line 14 will typically be in packet format. For sake of example, P1 and P2 are both preselected ten-chip sequences each associated with a unique one-bit data value as shown in Table 1:

TABLE 1

| Data Value | PN Sequence |
| --- | --- |
| 0 | P1 |
| 1 | P2 | where P1=1011011101 and P2=1111100000, for example.

Referring to FIG. 5A, the PN/DATA mapping circuit 16 in this example is represented by a two-bit serial-to-parallel shift register. The shift register stores two-bits D1–D0 such that the sequence of data to be transmitted is received via line 14 and is processed two-bits at a time. For each sequence of two-bits received via line 14, the mapping circuit 16 maps the bits as follows. Data bit D1 serves as the actual data to be transmitted and is provided on line 24 to the spreading multiplier 22. Data bit D0, on the other hand, serves as the data value to be encoded via the particular PN sequence used to transmit the data on line 24. Thus, data bit D0 is provided on line 20 as the PN sequence selection signal.

The PN sequence selector 18 is any digital logic circuit and/or lookup table which can output to the spreading multiplier 22 either P1 or P2 depending on the value of the PN sequence selection signal provided on line 20. For example, if the PN sequence selection signal has a data value 0 (i.e., D0=0), the PN sequence selector 18 will output the PN sequence P1 to the spreading multiplier 22. As a result, the data on line 24 (i.e., data bit D1) will be spread according to. conventional techniques with the PN sequence P1. Alternatively, if the PN sequence selection signal has a data value 1 (i.e., D0=1), the PN sequence selector will output the PN sequence P2 to the spreading multiplier 22. Accordingly, the data bit D1 on line 24 will be spread with the PN sequence P2. The thus spread data is then modulated by the BPSK modulator 26 and upconverted by the RF up conversion circuit 28 before being transmitted using the antenna 30. This process is repeated for each set of two consecutive bits, provided on line 14, with a first bit in the set serving as the data bit and the second bit serving as the bit which is encoded via the selected PN sequence. As will be appreciated, this equates to a doubling of the data throughput as compared with the case where each of the data bits is spread using conventional techniques.

Turning now to the receiver portion as shown in FIG. 5B, assume an RF signal including the sequence of data bits D1–D0 modulated in accordance with the procedure described above in relation to FIG. 5A is received via the antenna 36. The signal is down converted via the RF down conversion circuit 38 and is input to the PN sequence detector 40 as mentioned above. In the exemplary embodiment, the PN sequence detector 40 includes a bank 55 of PN code spread spectrum decoders, each respectively being of conventional design. In the exemplary two-bit embodiment, the bank 55 includes PN code spread spectrum decoders 55a and 55b, configured for decoding or despreading signals received at the preselected PN sequences P1 and P2, respectively. For example, decoder 55a is configured to decode PN coded data having the 10 chip PN sequence PN=1011011101. The decoder 55a generally includes a despreading multiplier 56a which despreads the received PN coded data using the PN sequence P1 provided by P1 sequence generator 57a. The output of the despreading multiplier 56a is provided to an integrator 58a which integrates the signal to produce a decoded data output on line 59a. The output of the integrator 58a is also fed back to a timing controller 60a which provides the appropriate timing adjustments to the P1 sequence generator 57a based on the output of the integrator 58a in order to obtain optimum correlation with the data received by the decoder 55a.

The decoder 55b similarly includes a despreading multiplier 56b, an integrator 58b, and receives an appropriate timing signal from the timing controller 60b. In this case, however, the despreading multiplier despreads the received data using the PN sequence P2 provided by a P2 sequence generator 57b. Thus, the decoder 55b is configured to decode PN coded data having the 10 chip PN sequence PN=1111100000. The PN coded data from the RF down conversion circuit 38 is input in parallel to both decoders 55a and 55b. The outputs from the decoders provided on lines 59a and 59b represent the decoded data using the P1 and P2 sequences, respectively. These outputs are provided to a circuit 62 for selecting the output from the decoders 55a and 55b which exhibits the best correlation between the signal which is received by the decoder and the particular PN code sequence for which it is designed.

As will be appreciated by those having ordinary skill in the art, the decoder which receives the PN coded signal spread with the particular PN sequence for which it is designed (i.e., P1 or P2), will exhibit the best correlation at its output. The circuit 62 can be a logic array and/or a switch or multiplexer which automatically couples the output of the decoder 55a or 55b exhibiting the best correlation onto line 42. In addition, the circuit 62 is designed to provide an output on line 46 indicating the particular PN sequence of the decoder exhibiting the best correlation (i.e., either P1 or P2). In other words, if decoder 55a provides the best correlation, it is known that the received data was transmitted using the PN sequence P1. If decoder 55b provides the best correlation, it is known that the received data was transmitted using the PN sequence P2. This information is then forwarded to the demapping circuit 50 via line 46.

The despread data output from the circuit 62 on line 42, in this case corresponding to the data bit D1 in FIG. 5A, is provided to the BPSK demodulator 44 where it is demodulated and output on line 48. In this example, the demapping circuit 50 includes a two-bit parallel to serial shift register 65 and a PN sequence conversion table 66. The conversion table 66 can be represented by a look up table stored in ROM and structured similar to Table 1 shown above. The PN code signal, provided on line 46, is used to index the table and thereby decode the remaining data bit D0. For example, if the PN sequence conversion table 66 receives a signal on line 46 indicating that the PN sequence P1 was used to despread the received data, the conversion table 66 outputs the data value D0=0 onto line 67. Alternatively, if the conversion table 66 receives a signal indicating that the PN sequence P2 was used to despread the received data, the conversion table 66 outputs the data value D0=1 onto line 67.

The demapping circuit 50 then reconstructs the originally transmitted data by providing the demodulated data bit D1 on line 48 to the parallel input of the first bit of the shift register 65. At the same time, the output of the PN sequence conversion table 66 provides the decoded value of D0 to the parallel input of the second bit of the shift register 65. The data bits D1–D0 are then shifted out of the register 65 onto line 52.

The above described process is carried out within the receiver portion 34 and is repeated for each set of two-bits received. Thus, the effective data throughput of the system is doubled as compared to a conventional DSSS BPSK system. Although not shown in the various figures, appropriate timing control between the various elements is carried out such that the data rate of the original data is constantly maintained. The provision of such timing will be apparent to those having ordinary skill in the art and is omitted herein for sake of brevity.

EXAMPLE 2

Figure 6A:
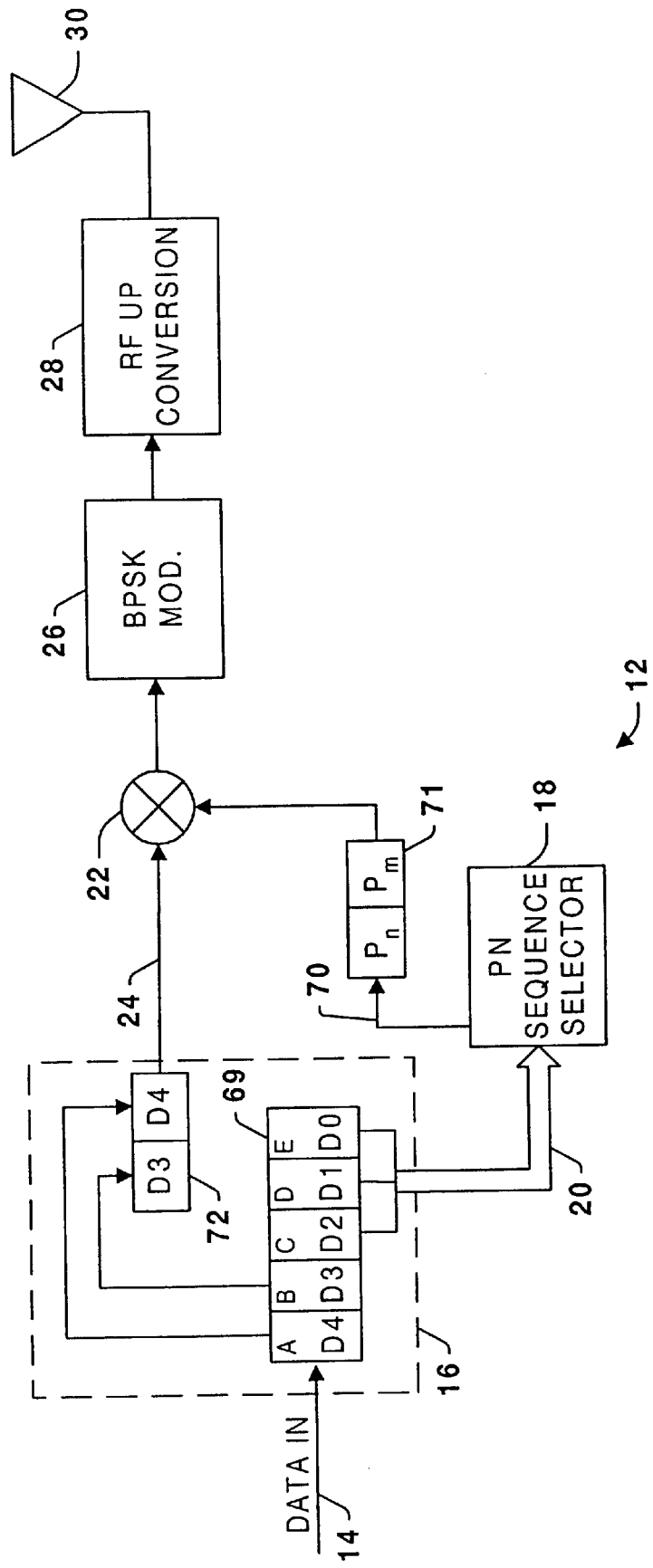
FIGS. 6A and 6B are block diagrams of a transmitter portion and receiver portion, respectively, of a DSSS BPSK system in accordance with a second example of the present invention wherein three different PN sequences are utilized to encode the data.
Figure 6B:
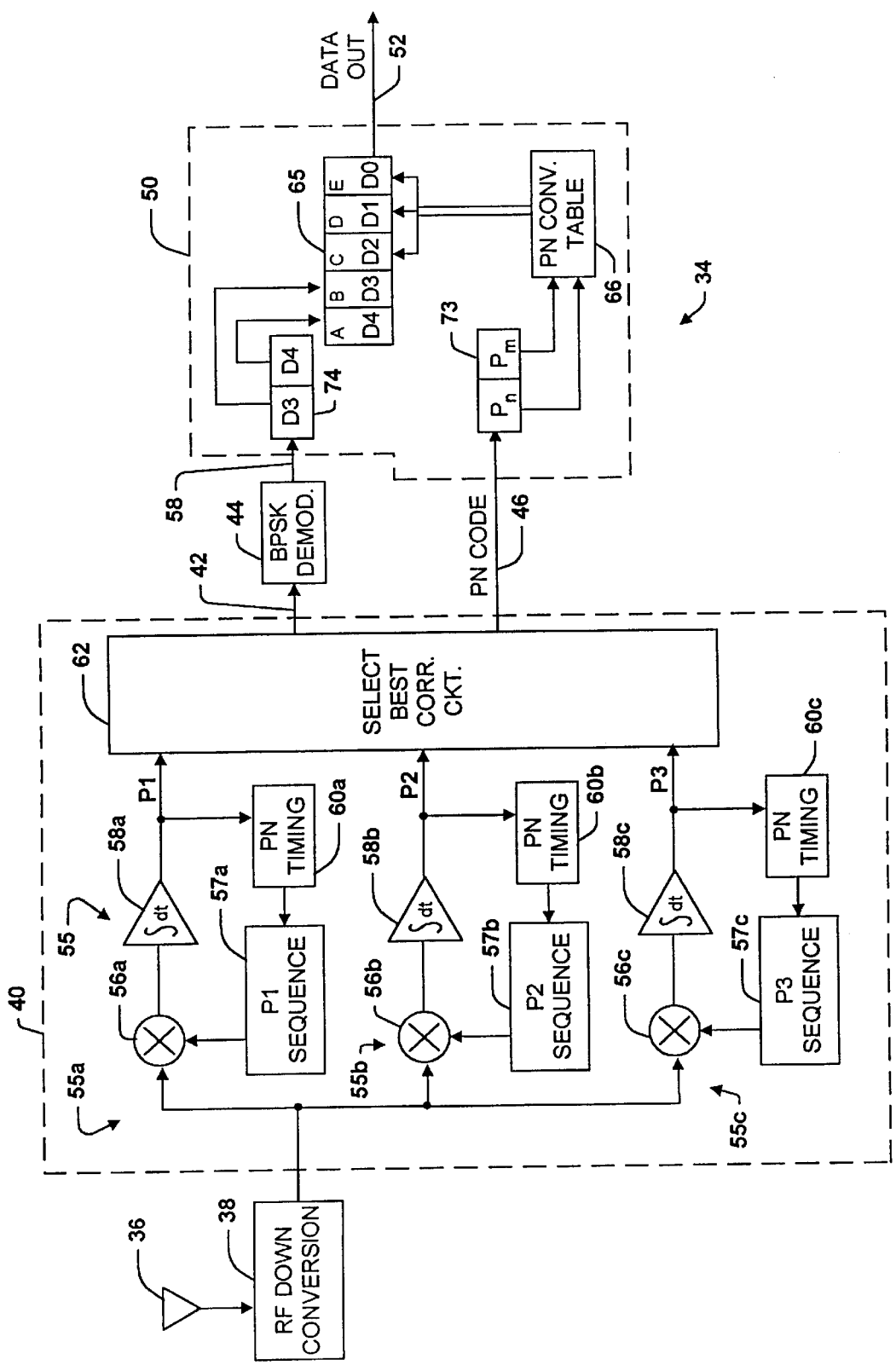

FIGS. 6A and 6B are detailed block diagrams of a transmitter portion 12 and receiver portion 34, respectively, of a DSSS BPSK system as represented in FIGS. 3A and 3B in accordance with a second example of the present invention. In this example, three different PN sequences are utilized to encode the data received on line 14 and are arbitrarily denoted P1 thru P3. For sake of example, P1 thru P3 are each represented by a preselected ten-chip sequence. Using three PN sequences, there are several methods of encoding the ordering of the usage of each code. For instance, there are nine possible ways to order these three sequences two at a time. Eight of these nine possible ways can each be associated with given three-bit data value as shown in Table 2.

TABLE 2

| Data Value | PN Sequences ($P_m P_n$) |
|---|---|
| 000 | P1P1 |
| 001 | P1P2 |
| 010 | P1P3 |
| 011 | P2P1 |
| 100 | P2P2 |
| 101 | P2P3 |
| 110 | P3P1 |
| 111 | P3P2 |
| Not used | P3P3 | where P1=1011011101; P2=1111100000 and P3=1010101010, for example.

In other words, any three-bits can be encoded by a unique set of two PN sequences $P_m P_n$ Table 2. Thus, in FIG. 6A the input data is provided on line 14 to the mapping circuit 16. In this example, the mapping circuit 16 includes a five-bit serial-to-parallel shift register 69 which holds five bits D4–D0 of the input data sequence at a time. Three-bits D2–D0 serve as the data to be encoded by way of the particular PN sequences $P_m P_n$ and are provided on line 20 (the term "line" also being used herein to refer to a multiline bus). The PN sequence selector 18 is any digital circuit designed to generate a PN sequence corresponding to the three-bits D2–D0 in accordance with the predetermined relationship. Using Table 2 as an example, the PN sequence selector 18 generates the PN sequences P1 and P3 when the D2–D0 data bits are "010". If the D2–D0 data bits provided on line 20 are "111", the PN sequence selector 18 generates the PN sequences P3 and P2, etc. The output of the PN sequence selector 18 is provided via line 70 to a PN sequence storage register 71 which stores the two particular PN sequences $P_m P_n$ provided by the PN sequence selector 18. The output of the storage register 71 is provided to the spreading multiplier 22 to be used as the spreading sequences for the data bits provided via line 24.

More specifically, the data bits D4 and D3 in the register 69 are provided to a parallel-to-serial data storage register 72 which is also included in the mapping circuit 16. The timing of the registers 72 and 71 is such that the data bit D4 is first provided to the spreading multiplier 22 and is spread using the first PN sequence $P_m$ provided by the PN sequence selector 18. Thereafter, the data bit D3 is provided to the spreading multiplier 22 and is spread using the second PN sequence PN provided by the PN sequence selector 18. The spread data values are then provided to the BPSK modulator 26 and are ultimately transmitted via the antenna 30. This procedure is repeated for each additional set of five data bits provided on line 14.

As a specific example, suppose that five bits of the input data sequence on line 14 are stored in the register 69 as data bits D4–D0 equal to "10011", respectively. Based on Table 2 above, the PN sequence selector 18 outputs the PN sequences P2 and P1 in that order (D2–D0=011). In the meantime, the data bits D4 and D3 are supplied by the register 72 to the spreading multiplier 22 in that order. Consequently, the data bit D4 (where D4=1) is spread using the PN sequence P2. Thereafter, the data bit D3 (D3=0) is spread using the PN sequence P1.

As will be appreciated, this example provides an improvement of 5 to 2 over BPSK using the traditional single spreading code method.

Referring now to the receiver portion 34, as shown in FIG. 6B, the only differences with respect to the first example are in the PN sequence detector 40 and the demapping circuit 50. In this example, the PN sequence detector 40 differs in that the bank of decoders 55 includes a third decoder 55c designed to despread the received signal using the PN sequence P3 as well as P1 and P2. In this manner, the PN sequence detector 40 is able to detect whether the received data has been spread using the PN sequence P3. The circuit 62 receives the outputs from each of the decoders 55a–55c and, as in the first example, couples the output of the decoder exhibiting the best correlation onto line 42. In addition, the circuit 62 provides a PN code signal on line 46 to the demapping circuit 50. Since the receiver will receive two modulated data values (i.e., D4–D3) in sequence, the circuit 62 provides a pair of PN code signals identifying the two PN sequences corresponding to the pair of demodulated data values.

The demapping circuit 50 includes a serial-to-parallel PN sequence identifier storage register 73 for storing the identity of the two PN sequences $P_m P_n$ used to spread the received data values. These two PN sequences then serve as an index to the PN conversion table 66 which is used to convert the pair of PN sequences back into the original data values D2–D0. More specifically, the conversion table 66 is set up similar to the Table 2 above. If the pair of PN sequences is P2P2, for example, the conversion table 66 outputs the data values "100" to bits D2–D0, respectively, to the five-bit shift register 65. In addition, the demodulated data values corresponding to bits D4 and D3 are output via line 58 from the BPSK demodulator 44 and are temporarily stored in a two-bit serial-to-parallel storage register 74. The data bits D4 and D3 are provided to the corresponding bits of the shift register 65 from the storage register 74, thus resulting in the original data values being reconstructed therein. The data values are then shifted out of the shift register 65 onto line 52.

In the above example, where the data bits D4–D0 transmitted by the transmitter portion are equal to "10011", the circuit 62 will first detect the modulated data bit D4 having been spread via the PN sequence P2. Consequently, the output from the decoder 55b is coupled onto line 42 and the circuit 62 will provide the PN code signal identifying P2 to the register 73. The modulated signal, corresponding to data bit D4, is demodulated and stored in the storage register 74. Next, the circuit 62 detects the modulated data bit D3 being transmitted via the PN sequence P1. As a result, the output from the decoder 55a is coupled onto line 42 by the circuit 62 and the PN code signal identifying P1 is provided to the register 73 where it is stored with the P2 identifier. The modulated signal, corresponding to the data bit D3, is demodulated and stored in the storage register 74 along side the data bit D4. The P2P1 combination is input from the register 73 to the conversion table 66 and is converted to the data values 011 in accordance with the assignments provided in Table 2. The outputs of the register 74 and conversion table 66 are then combined in the register 65 to complete the decoding procedure.

Thus, the above-described process is performed for each set of 5 bits in the data to be transmitted and received.

EXAMPLE 3

Figure 7A:
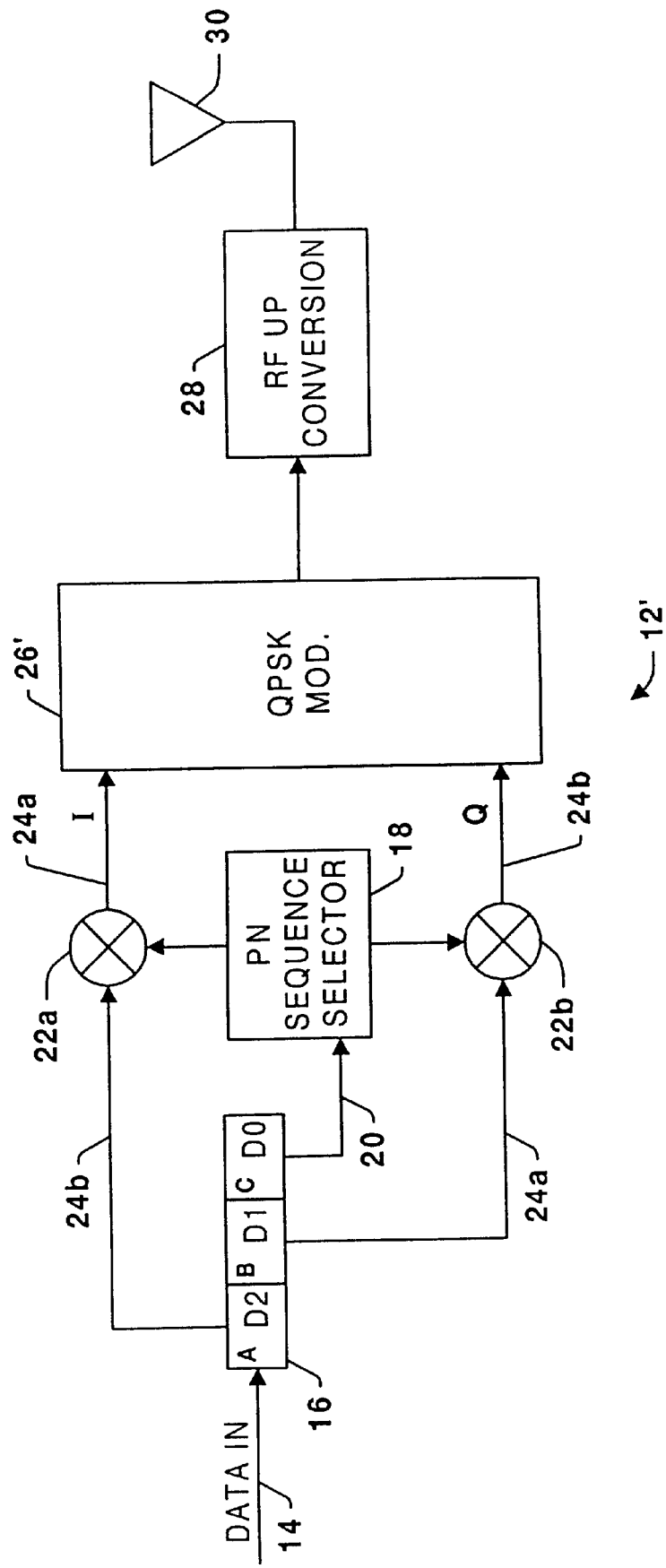
FIGS. 7A and 7B are block diagrams of a transmitter portion and receiver portion, respectively, of a DSSS QPSK system in accordance with a third example of the present invention wherein two different PN sequences are utilized to encode the data.
Figure 7B:
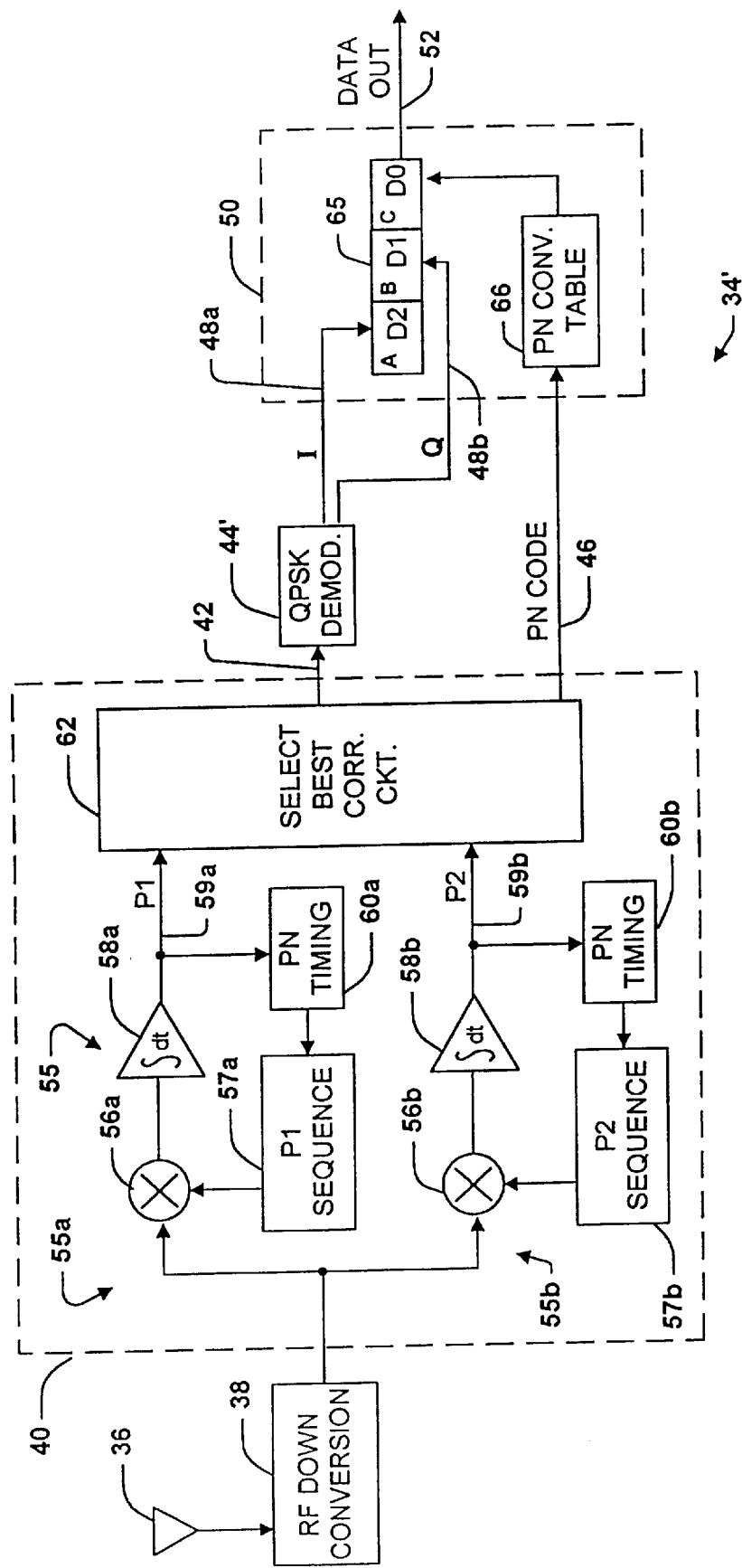

The above described features of the invention, relating to BPSK, can be extended to other modulation techniques with similar improvements in data throughput. For example, FIGS. 7A and 7B are detailed block diagrams of a transmitter portion and receiver portion, respectively, of a DSSS QPSK system in accordance with a third example of the present invention. In this particular example, two different PN sequences are utilized to encode the data. For simplicity, the same PN sequences and associated one-bit data values referred to in Example 1 are utilized.

In the receiver portion 12', the mapping circuit 16 includes a three-bit serial-to-parallel shift register for holding three-bits D2–D0 of the input data sequence at a time. The D0 data bit is provided to the PN sequence selector 18 which is identical to the PN sequence selector 18 described in Example 1; with the exception that the PN sequence corresponding to the encoded data bit D0 value is provided in parallel to both spreading multipliers 22a and 22b. At the same time, the data bit D2 value is provided to the spreading multiplier 22a so as to be spread based on the value of data bit D0 in order to form the I component. Similarly, the data bit D1 value is provided to the spreading multiplier 22b so as to form the Q component. Thus, the I and Q components are spread in accordance with the same PN sequence.

As for the receiving portion 34', the operation of the antenna 36, RF down conversion circuit 38 and PN sequence detector 40 is identical to that which is described above in connection with Example 1. The difference in the receiver portion 34', is that the modulated data signal output on line 42 from the circuit 62 is demodulated into I and Q components on lines 48a and 48b corresponding to data bits D2 and D1, respectively, by the QPSK demodulator 44'. The demapping circuit 50 in this example includes a three-bit shift register 65 into which the I and Q components are stored in the stages corresponding to data bits D2 and D1. In addition, the demapping circuit 50 includes the conversion table 66 which receives the PN sequence selection signal from the circuit 62 indicating the PN sequence utilized to transmit the D2 and D1 data bit values. The conversion table performs the same type of conversion, explained above in connection with Example 1, such that the value of data bit D0 is decoded and is stored in the register 65. The data thus received and stored in register 65 is then shifted out onto line 52.

According to this example where two different PN sequences are utilized to encode and transmit data using QPSK, a data throughput improvement of 3 to 2 over conventional DSSS QPSK is obtained.

EXAMPLE 4

Figure 8A:
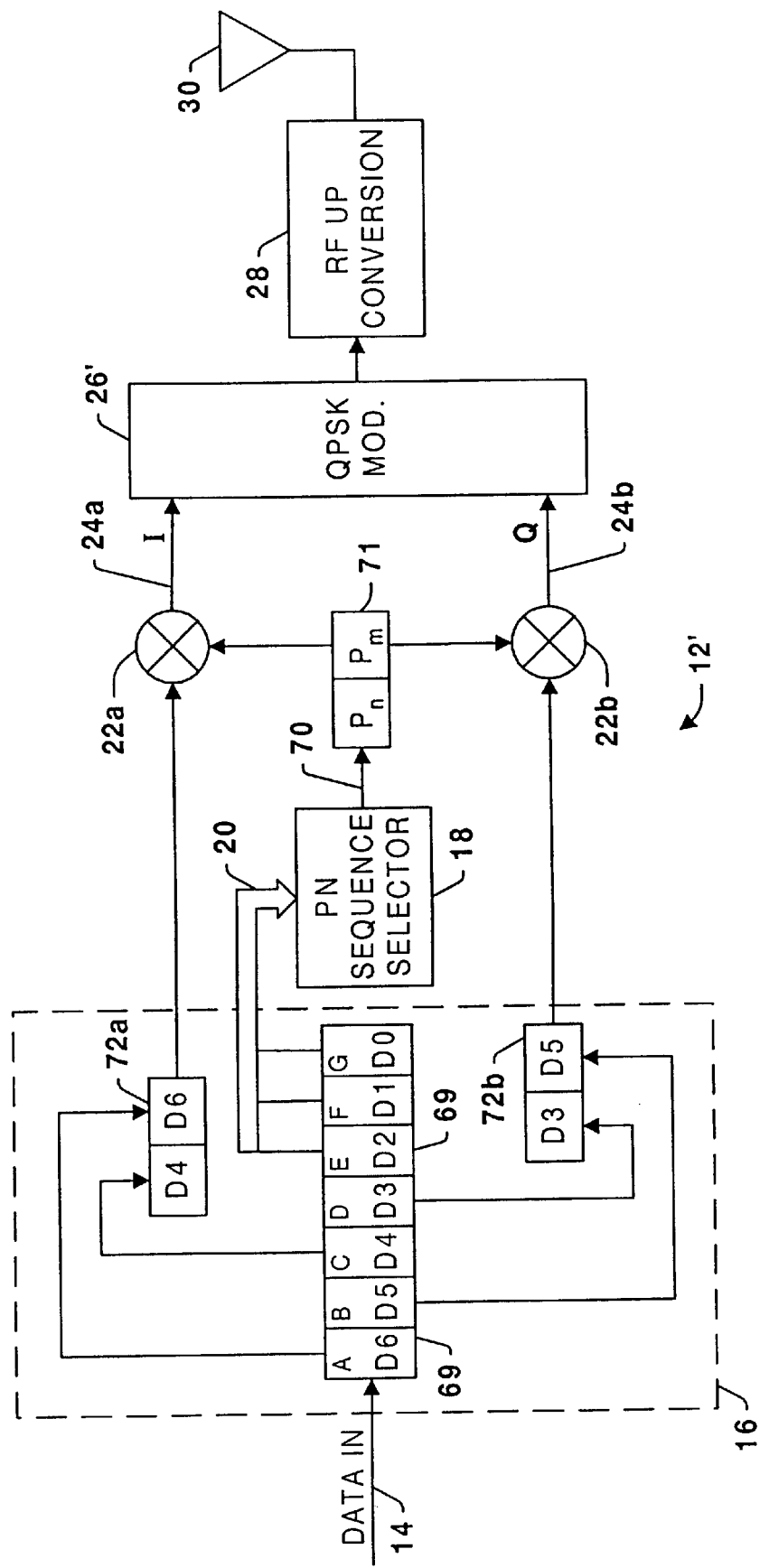
FIGS. 8A and 8B are block diagrams of a transmitter portion and receiver portion, respectively, of a DSSS QPSK system in accordance with a fourth example of the present invention wherein three different PN sequences are utilized to encode the data.
Figure 8B:
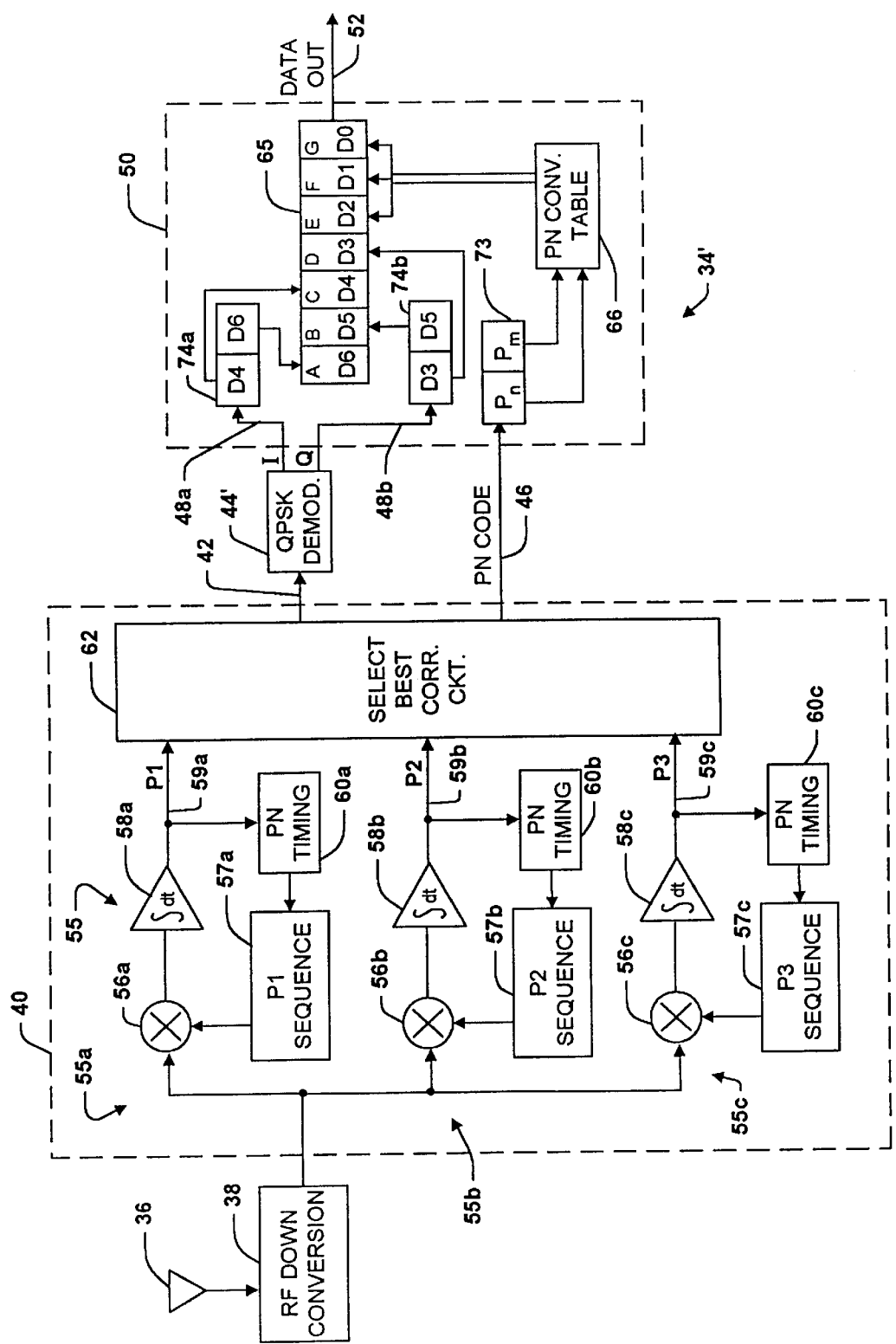

FIGS. 8A and 8B are detailed block diagrams of a transmitter portion 12' and receiver portion 34', respectively, of a DSSS QPSK system in accordance with a fourth example of the present invention. In this example, three different PN sequences are utilized to encode the data. For convenience, the same PN sequences and associated three-bit data values referred to in Example 2 are utilized.

In the transmitter portion 12', the mapping circuit 16 includes a seven-bit serial-to-parallel shift register 69 for storing a sequence of seven bits (D6–D0) at a time of the data input on line 14. The D6 and D4 bits are supplied to the two-bit parallel-to-serial data storage shift register 72a and represent the data bits to be transmitted sequentially as I components. The D5 and D3 bits are supplied to the two-bit data storage register 72b and represent the data bits to be transmitted sequentially as Q components. The D2–D0 data bits are provided to the PN sequence selector 18 which is identical to the PN sequence selector 18 described in Example 2; with the exception that each of the pair of PN sequences $P_m P_n$, corresponding to the encoded data bits D2–D0 obtained from Table 2, is provided one at a time to both spreading multipliers 22a and 22b.

The timing of the respective registers is such that the data bits D6 and D5 from registers 72a and 72b, respectively, are provided to the respective spreading multipliers 22a and 22b so as to both be spread by the first PN sequence $P_m$ provided by register 71. Next, the data bits D4 and D3 from registers 72a and 72b, respectively, are provided to the respective spreading multipliers 22a and 22b so as to both be spread by the second PN sequence $P_n$. As a result, the D6 and D5 bits are initially spread and transmitted as the I and Q components, respectively, using the PN sequence $P_m$. They are then followed by the D4 and D3 components which are spread and transmitted as the I and Q components using the PN sequence $P_n$. Thereafter, the above process is repeated for the next seven bits in the input data sequence.

As for the receiver portion 34', the operation of the antenna 36, RF down conversion circuit 38 and PN sequence detector 40 is identical to that which is described above in connection with Example 2. The differences in the receiver portion 34' is that the modulated data signal, output on line 42 from the circuit 62, is demodulated into I and Q components corresponding to data bits D6, D4 and D5, D3, respectively, by the QPSK demodulator 44'. The demapping circuit 50 in this example includes a pair of two-bit serial-to-parallel shift registers 74a and 74b for temporarily storing the data bits D6, D4 and D5, D3, respectively. These bits are then output to the corresponding locations in a seven bit shift register 65. In addition, the demapping circuit 50 includes the conversion table 66 which receives the PN sequence selection signals from the circuit 62 indicating the PN sequence pair $P_m P_n$ utilized to transmit the data bit values. The conversion table 66 performs the same type of conversion explained in connection with Example 2 such that the values of data bits D2–D0 are decoded and stored in the register 65 in the corresponding locations. The data thus received and stored in register 65 is then shifted out onto line 52.

According to this example, where three different PN sequences are utilized to encode and transmit data using QPSK, a data throughput improvement of 7 to 4 over conventional DSSS QPSK is obtained.

Figure 9:
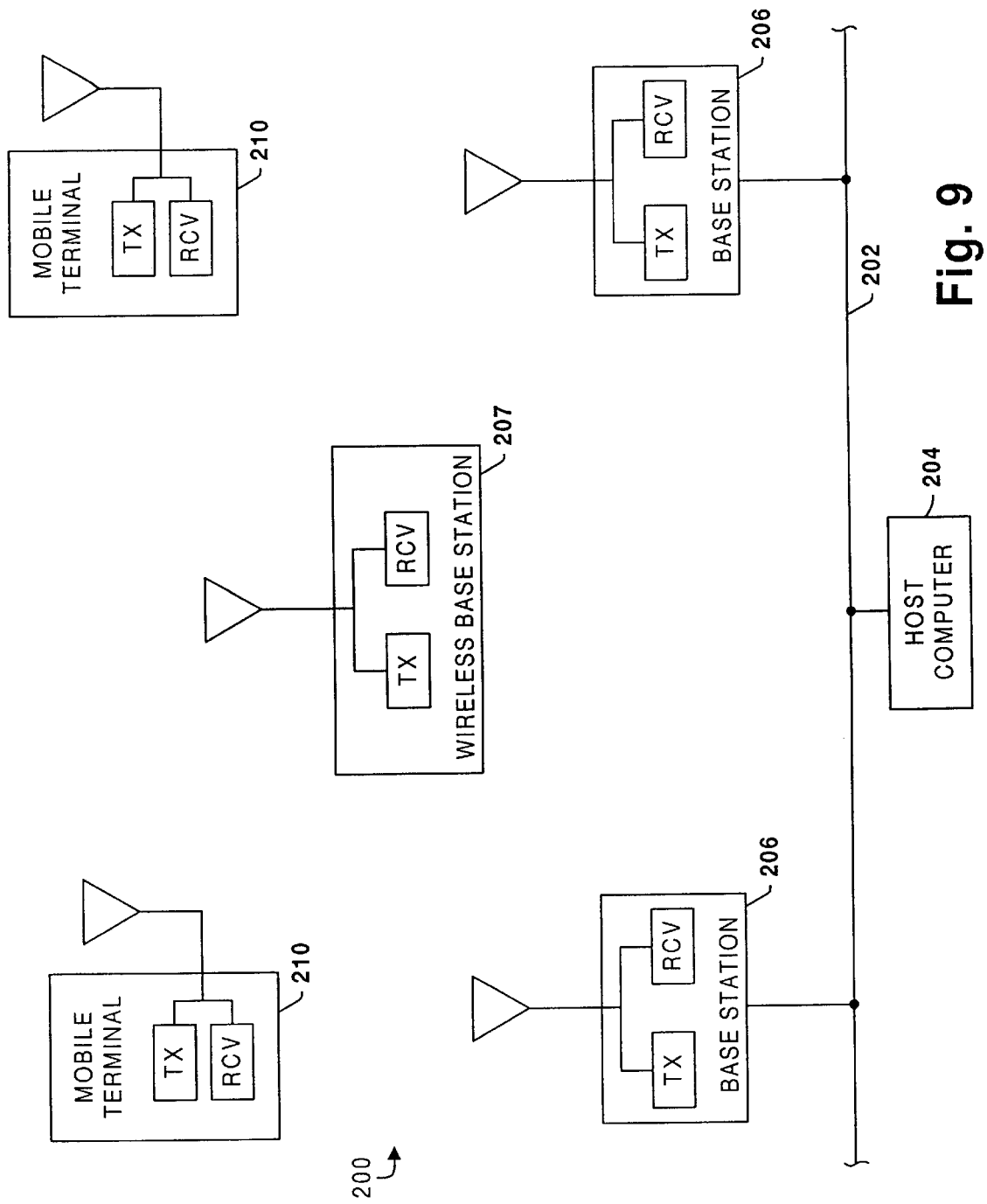
FIG. 9 is a block diagram of a cellular communication system in accordance with the present invention.

Referring now to FIG. 9, a cellular communication system in accordance with the present invention is generally designated 200. The system 200 incorporates the above-described principles for improving data throughput by way of using different PN sequences to encode the data being transmitted. More particularly, the system 200 includes a system backbone 202 with a host computer 204 and one or more base stations 206 and wireless base stations 207. The system 200 further includes one or more mobile terminals 210 which wirelessly communicate with devices on the system backbone 202 via the base stations 206 and/or the wireless base stations 207. More specifically, data is transmitted via radio signals between the mobile terminals 210 and the base stations 206 which are hardwired to the system backbone 202. In this manner, the mobile terminals 210 are able to remain in communication with the system backbone 202 as the mobile terminals 210 roam within the system. The wireless base stations 207 serve as repeaters to extend the range of communication as is known.

As shown in FIG. 9, each of the mobile terminals 210 and base stations 206 and 207 include a transmitter portion TX and a receiver portion RCV for wirelessly sending and receiving information via a corresponding antenna. In the preferred embodiment, each of the transmitter portions TX and receiver portions RCV are configured and operate in accordance with the principles of the present invention exemplified above in relation to FIGS. 3A–3B, 4A–4B, 5A–5B, 6A–6B, 7A–7B and 8A–8B. Consequently, the mobile terminals 210 can transmit and receive data to/from the base stations 206 and 207 with a high data throughput.

In view of the above examples and description, it will be apparent to those having ordinary skill in the art that the present invention has utility for increasing the overall data throughput of a system. Although the invention has been described by way of four specific examples, there are numerous different ways in which different PN sequences can be employed to encode a portion of the data and thereafter used to spread the remaining data in a sequence. The invention is intended to include each and all of these different embodiments. For example, taking three spreading sequences three at a time results in twenty seven unique combinations. One method of coding these three spreading sequences is to let sixteen of the 27 combinations represent 4 bits of data; i.e., P1P1P1=0000 and P1P1P2=0001, etc. This will result in a 7 to 3 improvement for BPSK and a 10 to 6 improvement for QPSK.

Other coding techniques such as Huffman coding and trellis encoding can be used to further increase the gains offered by using multiple spreading sequences to represent the data. Trellis coding will reduce the possible number of next states that are required to be searched. The present invention can be used to transmit forward error correction (FEC) information bits which will result in a system performance increase due to the significant decrease in packet retransmissions.

The present invention is described above using a bank of correlators, operating in parallel, to determine the particular PN sequence used to spread the received data. It will be appreciated, however, that another embodiment may include a serial correlator. To maintain efficient correlation time, the PN sequences in the serial correlator could be selected such that the receiver portion can determine which PN sequence is used after checking only a few chips (e.g., 3 chips). Further, a digital correlation technique could be utilized in accordance with the invention. Such a digital correlation technique is described in U.S. patent application Ser. No. 08/335,328 for "A Correlation System for Use in Wireless Direct Sequence Spread Spectrum Systems", filed Nov. 7, 1994. The disclosure of application Ser. No. 08/335,328 is hereby incorporated in full by reference.

Furthermore, the above examples set forth a specific number of bits being transmitted using the selected sequences. It will be appreciated, however, that many other arrangements are possible. Likewise, although particular data bits are shown in the sequence as being utilized to select the PN sequence, other data bits could similarly be employed. It will also be appreciated that although the invention is described in the context of either encoding the input data by way of selecting one or more PN sequences or transmitting the input data via the selected PN sequence(s), not all of the data needs to be encoded or spread. For example, portions of the input data may be transmitted using conventional techniques. Determinations as to which data is transmitted in accordance with which technique can be made in accordance with a predefined protocol. In addition, the above examples are implemented primarily by way of hardware. Nevertheless, much of the invention could also be carried out via software as will be appreciated. Moreover, specific 10-chip PN sequences are presented above by way of example. It is noted that the invention is by no means limited to the use of any particular number of PN sequences, number of chips in the sequences, or specific PN sequences. For example, 11-chip PN sequences can easily be employed.

It is also noted that while the invention is described primarily in the context of an RF communication system, and a cellular communication system in particular, the invention has application in various other types of communication systems are well.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method for communicating a plurality of data values using multiple spreading sequences, comprising the steps of:
   selecting at least one of the multiple spreading sequences based on at least one data value included in the plurality of data values; and
   transmitting other data values included in the plurality of data values using the at least one of the multiple spreading sequences to spread the other data values.

2. The method of claim 1, further comprising the steps of:
   receiving the other data values;
   detecting the at least one of the multiple spreading sequences used to spread the other data values; and
   reconstructing the plurality of data values based at least in part on the other data values received and the detected at least one of the multiple spreading sequences.

3. The method of claim 2, wherein each of the multiple spreading sequences has a unique data value associated therewith.

4. The method of claim 1, wherein the multiple spreading sequences comprise at least three spreading sequences.

5. The method of claim 1, wherein the other data values are transmitted using BPSK modulation.

6. The method of claim 5, wherein the plurality of data values comprises a sequence of data bits, the value of every other data bit in the sequence determines which of the multiple spreading sequences is selected in the selecting step, and the selected at least one of the spreading sequences is used to spread a data bit adjacent the every other data bit in the transmitting step.

7. The method of claim 5, wherein the plurality of data values comprises a sequence of data bits, the values of at least three out of every five consecutive data bits in the sequence determines which of the multiple spreading sequences is selected in the selecting step, and the selected at least one of the spreading sequences is used to spread other data bits.

8. The method of claim 1, wherein the spread portion of the other data values are transmitted using QPSK modulation.

9. The method of claim 8, wherein the plurality of data values comprises a sequence of data bits, the values of at least one of every three consecutive data bits in the sequence determines which of the multiple spreading sequences is selected in the selecting step, and the selected at least one of the spreading sequences is used to spread other data bits.

10. The method of claim 8, wherein the plurality of data values comprises a sequence of data bits, the values of at least three out of every seven consecutive data bits in the sequence determines which of the multiple spreading sequences is selected in the selecting step, and the selected at least one of the spreading sequences is used to spread other data bits.

11. A device for communicating a plurality of data values using multiple spreading sequences, comprising:
    a selection circuit for selecting at least one of the multiple spreading sequences based on at least one data value included in the plurality of data values; and
    a transmitting circuit for transmitting other data values included in the plurality of data values using the at least one of the multiple spreading sequences to spread the other data values.

12. The device of claim 11, further comprising:
    a receiving circuit for receiving the spread other data values;
    a detector circuit for detecting among a plurality of spreading sequences which spreading sequences were used to spread the received other data values; and
    a circuit for constructing a plurality of data values based at least in part on the received spread portion of data values and the detected spreading sequences, wherein the number of constructed data values exceeds the number of received other data values.

13. The device of claim 12, wherein each of the multiple spreading sequences has a unique data value associated therewith.

14. The device of claim 11, wherein the multiple spreading sequences comprise at least three spreading sequences.

15. The device of claim 11, wherein the spread other data values are transmitted by the transmitter circuit, using BPSK modulation.

16. The device of claim 15, wherein the plurality of data values comprises a sequence of data bits, the selection circuit uses the value of every other data bit in the sequence to determine which of the multiple spreading sequences is selected, and the selected at least one of the spreading sequences is used by the transmitter circuit to spread a data bit adjacent the every other data bit.

17. The device of claim 15, wherein the plurality of data values comprises a sequence of data bits, the selection circuit uses the values of at least three out of every five consecutive data bits in the sequence to determine which of the multiple spreading sequences is selected, and the selected at least one of the spreading sequences is used by the transmitter circuit to spread other data bits.

18. The device of claim 11, wherein the spread other data values are transmitted by the transmitter circuit using QPSK modulation.

19. The device of claim 18, wherein the plurality of data values comprises a sequence of data bits, the selection circuit uses the values of at least one of every three consecutive data bits in the sequence to determine which of the multiple spreading sequences is selected, and the selected at least one of the spreading sequences is used by the transmitter circuit to spread other data bits.

20. The device of claim 18, wherein the plurality of data values comprises a sequence of data bits, the selection circuit using the values of at least three out of every seven consecutive data bits in the sequence to determine which of the multiple spreading sequences is selected, and the selected at least one of the spreading sequences is used by the transmitter circuit to spread other data bits.

21. The device of claim 11, wherein the transmitter circuit comprises a radio frequency transmitter.

22. A network comprising a plurality of devices as recited in claim 12.

23. The network of claim 22, wherein each of the devices comprises a radio frequency transmitter circuit and receiver circuit.

24. A cellular communication system, comprising:
a network;
a host computer coupled to said network;
a plurality of base stations coupled to said network and communicating with said host computer, each of the base stations comprising a base station transmitter system for transmitting wireless communications and a base station receiver system for receiving wireless communications; and
a plurality of mobile terminals each for communicating with the network by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations;
wherein, with respect to at least one of the mobile terminals, at least one of the mobile terminal transmitter systems wirelessly communicates a set of data having a first subset and a second subset different than the first subset by selectively encoding each data bit of said second subset with one of one or more spreading sequences selected by said first subset and wirelessly transmitting said encoded second subset.

25. The cellular communication system of claim 24, wherein with respect to at least one of the base stations, at least one of the base stations receiver systems receives said second subset and reconstructs said set of data based on said second subset and said one or more spreading sequences.

26. The cellular communication system of claim 25, wherein said cellular communication system is a direct sequence spread spectrum system.

27. The cellular communication system of claim 26, wherein each of said one or more spreading sequences is an eleven chip pseudo-noise code.

28. A cellular communication system, comprising:
a network;
a host computer coupled to said network;
a plurality of base stations coupled to said network and communicating with said host computer, each of the base stations comprising a base station transmitter system for transmitting wireless communications and a base station receiver system for receiving wireless communications; and
a plurality of mobile terminals each for communicating with the network by way of at least one of the plurality of base station, each of the plurality of mobile terminals having a mobile terminal transmitter for transmitting wireless communications to the at least one of the plurality of base stations and a mobile terminal receiver system for receiving wireless communications from the at least one of the plurality base stations;
wherein, with respect to at least one of the base stations, at least one of the base station transmitter systems wirelessly communicates a set of data having a first subset and a second subset different than the first subset by selectively encoding each data bit of said second subset with one of one or more spreading sequences selected by said first subset and wirelessly transmitting said encoded second subset.

29. The cellular communication system of claim 28, wherein with respect to at least one of the mobile terminals, at least one of the mobile terminal receiver systems receives said second subset and reconstructs said set of data based on said second subset and said one or more spreading sequences.

30. The cellular communication system of claim 29 wherein said cellular communication system is a direct sequence spread spectrum system.

31. The cellular communication system of claim 28 wherein said second subset is transmitted using a BPSK modulation technique.

32. A method of encoding a set of data bits for transmission in a cellular communication system, said set of data bits comprising a first subset of data bits and a second subset of data bits, said method comprising the steps of:
preselecting two or more spreading sequences;
preassigning a unique value to each of one or more different arrangements of said preselected two or more spreading sequences, each of said unique values representing one or more data bits;
representing said first subset of data bits with one of said one or more different arrangements of said preselected two or more spreading sequences in accordance with a predefined relationship between said first subset of data bits and said preassigned unique values; and
encoding said second subset of data bits based on the one arrangement of said preselected two or more spreading sequences representing said first subset of data bits.

33. The method of claim 32, further comprising the step of repeating said preselecting, preassigning, representing and encoding steps for each of a plurality of sets of data bits included in a sequence of data bits.

34. The method of claim 32, further comprising the step of BPSK modulating said encoded second subset of data bits.

35. The method of claim 32, further comprising the step of QPSK modulating said encoded second subset of data bits.

36. The method of claim 32, wherein said preselected two or more spreading sequences comprises at least three spreading sequences.

37. A method of communicating in a cellular communication system using multiple spreading sequences, comprising the steps of:
- selecting a set of data bits to be communicated, said set of data bits consisting of a first subset of data bits and a second subset of data bits,
- selecting a spreading set based on said first subset of data bits, said spreading set consisting of one or more of said multiple spreading sequences;
- encoding said second subset of data bits, each bit of said second subset of data bits being encoded with a spreading sequences selected from said spreading set; and
- transmitting said second subset of data bits.

38. The method of claim 37, further comprising the steps of:
- receiving said second subset of data bits;
- detecting the spreading set consisting of the one or more of the multiple spreading sequences; and
- reconstructing said set of data bits to be communicated based on said second subset of data bits and said detected spreading set.

39. A method for communicating a plurality of data values using multiple spreading sequences, comprising the steps of:
- selecting at least one of the multiple spreading sequences based on at least one data value included in the plurality of data values;
- applying the at least one of the multiple spreading sequences to other of the plurality of data values so as to directly encode the other of the plurality of data values; and
- transmitting the other of the plurality of data values encoded with the at least one of the multiple spreading sequences.

40. The method of claim 39, further comprising the steps of:
- receiving the other of the plurality of data values encoded with the at least one of the multiple spreading sequences; and
- reconstructing the plurality of data values based at least in part on the other of the plurality of data values received and the detected at least one of the multiple spreading sequences.

* * * * *